United States Patent
Orth et al.

(10) Patent No.: US 9,678,323 B2
(45) Date of Patent: Jun. 13, 2017

(54) HIGH THROUGHPUT MULTICHANNEL FLUORESCENCE MICROSCOPY WITH MICROLENS ARRAYS

(71) Applicant: President and Fellows of Harvard College, Cambridge, MA (US)

(72) Inventors: Antony Orth, Somerville, MA (US); Kenneth B. Crozier, West Melbourne (AU)

(73) Assignee: President and Fellows of Harvard College, Cambridge, MA (US)

( * ) Notice: Subject to any disclaimer, the term of this patent is extended or adjusted under 35 U.S.C. 154(b) by 253 days.

(21) Appl. No.: 14/735,534

(22) Filed: Jun. 10, 2015

(65) Prior Publication Data
US 2015/0355449 A1 Dec. 10, 2015

Related U.S. Application Data

(60) Provisional application No. 62/010,390, filed on Jun. 10, 2014.

(51) Int. Cl.
| | |
|---|---|
| *G02B 21/16* | (2006.01) |
| *G06T 5/50* | (2006.01) |
| *G02B 21/36* | (2006.01) |

(52) U.S. Cl.
CPC ........... *G02B 21/16* (2013.01); *G02B 21/361* (2013.01); *G02B 21/365* (2013.01); *G06T 5/50* (2013.01); *G06T 2207/10024* (2013.01); *G06T 2207/10052* (2013.01); *G06T 2207/10056* (2013.01); *G06T 2207/10064* (2013.01); *G06T 2207/20208* (2013.01)

(58) Field of Classification Search
CPC .... G02B 21/16; G02B 21/361; G02B 21/365; G06T 5/50
See application file for complete search history.

(56) References Cited

U.S. PATENT DOCUMENTS

2002/0088858 A1* 7/2002 Tanaami ............ G01N 21/6452
235/454

* cited by examiner

*Primary Examiner* — Nam Pham
(74) *Attorney, Agent, or Firm* — Peter A. Nieves; Sheehan Phinney Bass & Green PA

(57) ABSTRACT

A microscope includes a multi-wavelength emitting laser light source. A microscope objective is configured to receive and expand input light emitted from the light source, and a dichroic mirror is configured to reflect the expanded input light. A micro lens array with a plurality of micro lenses splits the reflected and expanded input light onto a fluorescence producing sample. A lens collectively captures the fluorescence for each micro lens in the plurality of micro lenses, and a camera receives the fluorescence from the lens and produces an image of the sample based on the received fluorescence.

22 Claims, 8 Drawing Sheets

HIGH THROUGHPUT MULTICHANNEL FLUORESCENCE MICROSCOPY WITH MICROLENS ARRAYS

CROSS-REFERENCE TO RELATED APPLICATIONS

This application claims the benefit of U.S. Provisional Patent Application Ser. No. 62/010,390, filed Jun. 10, 2014, entitled "High throughput multichannel fluorescence microscopy with microlens arrays" which is incorporated by reference herein in its entirety.

FEDERALLY SPONSORED RESEARCH

This invention was made with government support under ECCS-1201687 awarded by the National Science Foundation. The government has certain rights in the invention.

FIELD OF THE INVENTION

The present invention relates to imaging, and more particularly, is related to multichannel fluorescence microscopy.

BACKGROUND OF THE INVENTION

Fluorescence microscopy is widely used in biological research to visualize morphology from a whole organism down to the cellular level. In the field of high content screening (HCS), fluorescence microscopy followed by image analysis is used to quantify the reactions of cells to candidate drugs at varying dosages. This has typically involved imaging microwell plates, for example, automated microscopes limited to at least approximately 1-2 seconds per imaging position, and outfitted with cameras with up to 4.66 megapixels. Such microscopes therefore achieve throughputs of about 4.66 megapixels per second (Mpx/s) at best. For 7.3 mm square wells imaged at 0.5 µm/pixel, this corresponds to approximately 73 minutes per 96-well plate. The imaging throughput represents a bottleneck to drug discovery efforts. A conventional automated wide-field microscope builds up an image by stitching together $10^3$-$10^4$ smaller fields-of-view (FOVs), each imaged by a microscope objective. After each of the small FOV is acquired, the sample is moved by a distance equal to the linear dimension of the field of view before the next image can be taken. Additionally, the position of the microscope objective is adjusted so that the subsequent image is in focus. Consequently, most of the image acquisition time is spent on mechanical movement rather than on photon collection. Therefore, there is a need in the art to address one or more of the abovementioned shortcomings.

SUMMARY OF THE INVENTION

Embodiments of the present invention provide devices and methods for high throughput multichannel fluorescence microscopy with microlens arrays. Briefly described, the present invention is directed to a microscope that includes a multi-wavelength emitting laser light source. A microscope objective is configured to receive and expand input light emitted from the light source, and a dichroic mirror is configured to reflect the expanded input light. A micro lens array with a plurality of micro lenses splits the reflected and expanded input light onto a fluorescence producing sample. A lens collectively captures the fluorescence for each micro lens in the plurality of micro lenses, and a camera receives the fluorescence from the lens and produces an image of the sample, based on the received fluorescence.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 1B (ii) is a diagram showing a zoom-in of a boxed area outlined area in FIG. 1B (i).

DETAILED DESCRIPTION

Figure 1A:
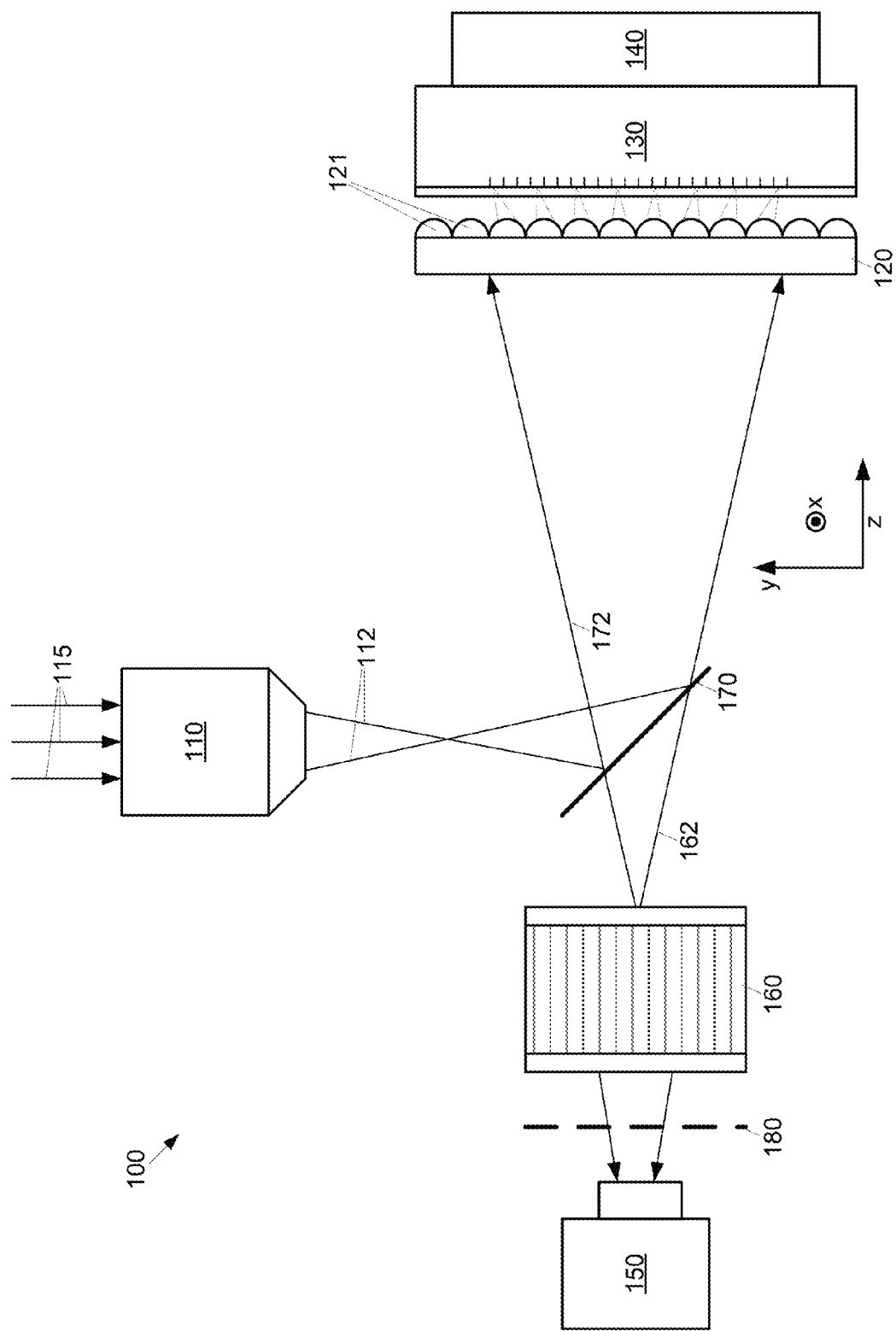
FIG. 1A is a schematic diagram of a first embodiment of an extended dynamic range microlens array (MLA) microscope.

The following definitions are useful for interpreting terms applied to features of the embodiments disclosed herein, and are meant only to define elements within the disclosure.

As used within this disclosure, "substantially" means within reasonable operating tolerances. For example, a substantially perpendicular light beam may not be exactly perpendicular, but within reasonable manufacturing tolerances.

Reference will now be made in detail to embodiments of the present invention, examples of which are illustrated in the accompanying drawings. Wherever possible, the same reference numbers are used in the drawings and the description to refer to the same or like parts.

Exemplary embodiments of a multichannel fluorescence microscopy technique for high throughput imaging applications are presented. A microlens array with over 140,000 elements is used to image centimeter-scale samples at up to 18.1 megapixels per second. Multiple fluorescent channels are imaged sequentially and aligned, for example in software, to create large full field multichannel images. An extended dynamic range of this approach is also discussed.

Embodiments of arrayed and structured illumination imaging platforms that aim to reduce imaging time are discussed. In general the sample is illustrated with an array of focal spots that act as a group of scanning microscope. Photons are collected with a camera at a high speed, increasing the information throughput. This allows for photon collection while the sample is moving, which is impossible with a regular wide field microscope due to motion blur. Continuously imaging during sample movement relaxes the demands for fast stage accelerations over large distances.

These focal spot scanning techniques have been demonstrated in a brightfield configuration by employing a holographic mask to shape an illuminating laser beam into an array of focal spots. These demonstrations create images where light absorption is the contrast mechanism. Similar systems have also been used to image fluorescence where the focal spot array is created by the Talbot effect generated by a microlens array illuminated by a laser beam. The embodiments discussed here include advanced implementations of previously reported large FOV microscope that uses a microlens array to directly focus a laser beam into a grid of focal spots. This technique provides high throughput microscopy.

Exemplary embodiments of the present invention provide acquisition of high-resolution fluorescence images free of ghosting and streaking artifacts that are often seen in prior multi-spot microscopy systems. Ghosting and low contrast can be particularly problematic in systems where the focal spot grid is created by diffractive effects because any residual laser excitation outside of the focal spots contribute to background noise, thus degrading the signal to noise ratio, resolution and decreasing overall system efficiency. The focusing mechanisms of the present embodiments are entirely refractive which results in high efficiency and signal to background ratio. This allows for high resolution images of samples with high spatial frequency features.

An object of the high throughput imaging embodiments is to reduce or eliminate mechanical dead time by continuously imaging the sample (or work piece) as it is being scanned in two dimensions. The optical layout of a first exemplary embodiment is shown in FIG. 1A.

FIG. 1A is a schematic diagram of a first embodiment of an extended dynamic range microlens microscope 100. A microscope objective 110 expands a received laser beam 115 into an expanded laser beam 112 that is focused into an array of focal spots by a microlens array (MLA) 120 on a fluorescent sample 130. The sample 130 sits on a raster scanning piezo stage (PS) 140 and the MLA 120 is imaged onto a camera 150 by a single lens reflex (SLR) 160 lens. A quad-band dichroic mirror (DM) 170 reflects the laser lines (473/532/658 nm) while passing fluorescence wavelengths 162. Combined laser and fluorescent light 172 is reflected/transmitted by the DM 170 to the MLA 120. An emission filter (EF) 180 provides additional wavelength filtering. The elements of this system are described in more detail below.

Figure 1B:
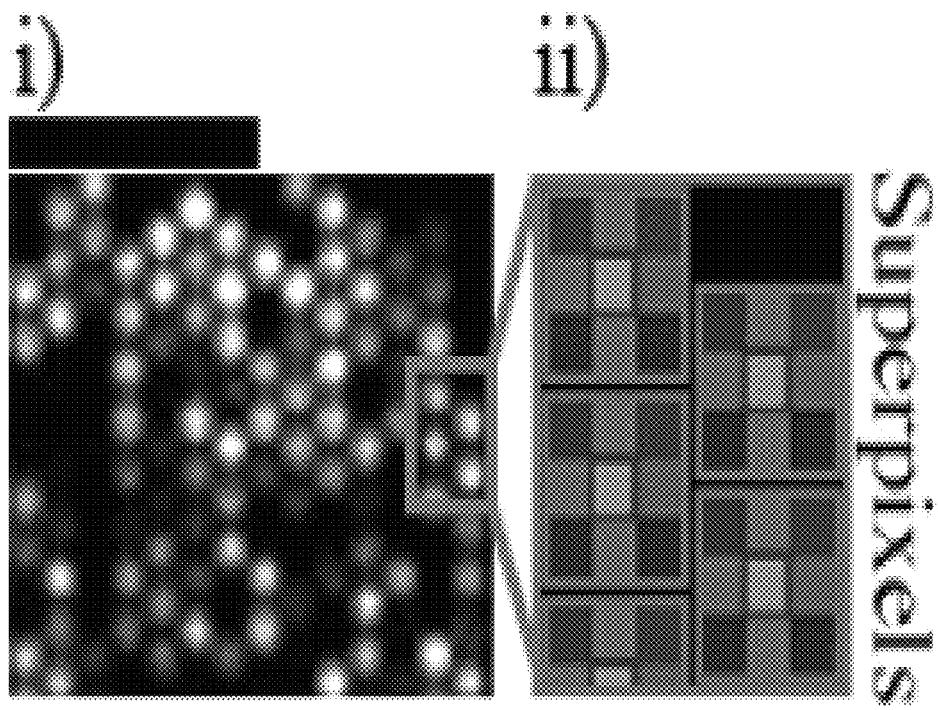
FIG. 1B (i) is a diagram of a raw image of the microlens array of FIG. 1A as recorded by a camera.
Figure 1C:
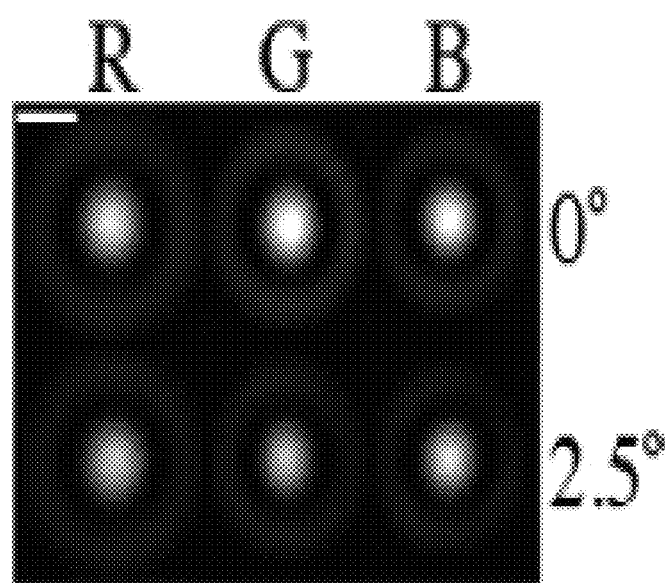
FIG. 1C is a diagram showing representative focal spots created by the MLA of FIG. 1A with red (R), green (G) and blue (B) lasers at field angles of 0° and 2.5°.

FIG. 1B (i) shows a raw image of MLA as recorded by the camera 150. The scale bar is 1 mm. FIG. 1B (ii) shows a zoom-in of boxed area outlined area in FIG. 1B (i). Representative N=9 superpixels are outlined in light grey, while N=1 superpixels are outlined in dark grey. FIG. 1C shows representative focal spots created by the MLA 120 with red (R), green (G) and blue (B) lasers at field angles of 0° and 2.5°. The scale bar is 2 µm.

A multi-wavelength excitation laser (not shown) for example, a Laserglow with wavelengths of 473/532/658 nm, emits the beam 115 with an output power of up to 150 mW per channel. The beam 115 is expanded by a 50× microscope objective 110 and reflected into an optical path by the dichroic mirror 170, for example, a quad-band dichroic mirror (Chroma zt405/473/532/660rpc). The MLA 120, for example, a 125 µm pitch hexagonal grid MLA, splits the laser beam 172 into an array of focal spots. Because the laser beam 172 is not collimated when it hits the microlens array 120, the microlenses 121 at the periphery of the MLA 120 create focal spots at a field angle of up to 2.5°. This is indicated by the slight tilt of the focal spots created by the microlens array 120 on the fluorescent sample 130 as shown in FIG. 1A.

Each microlens 121 in the MLA 120 functions as an independent point scanning microscope by collecting the fluorescence emitted at its focal spot and relaying it back to the camera 150, for example, a Basler acA2000-340 km CMOS camera via the SLR 160, for example, a 50 mm focal length, f/1.4 single lens reflex camera lens with an aperture set to f/8. The SLR lens 160 may be located, for example, 400 mm from the microlens array 120, a distance substantially equal to a separation distance between the focal plane of the expansion microscope objective 110 and the microlens array 120.

For example, each of the microlenses 121 under the first embodiment may be on the order of 122 µm in diameter, arranged in a 125 µm pitch hexagonal grid. The microlenses 121 may be approximately 11.7 µm tall, which is referred to as the "sag." The microlenses 121 may have a focal length of 248 µm. Examples of such mircolenses include those made from Norland Optical adhesive 61 which has a refractive index of approximately 1.565 in the visible wavelength range.

The fluorescence collected by each microlens 121 of the MLA 120 exits an aperture of the microlens 121 at the same angle as the laser illumination 172 at the position of the microlens 121 in the microlens array 120. Consequently, the fluorescence 162 converges to the center of an aperture of the SLR 160. This geometry avoids vignetting from microlenses towards the periphery of the MLA 120. For example, if the illuminating laser beam 112 were collimated, some of the signal from non-central microlenses 121 would miss the physical aperture of the SLR lens 160. This is a similar concept to the de-scanning mirrors in a point scanning confocal microscope. Without de-scanning the fluorescence collected by the microscope objective 110, the signal in a confocal microscope would miss the confocal pinhole for non-zero field angles (away from the center of the FOV).

A fluorescence filter 180 between the SLR lens 160 and the camera 150 filters the wavelength range appropriate for the fluorophore being employed, e.g. allowing transmission of the fluorescent emission while blocking the excitation light. The placement of the SLR lens 160, for example, 400 mm from the MLA 120, results in approximately a sevenfold de-magnified image of the microlens array 120 at the sensor plane of the camera 150.

Each type of fluorophore has a distinct wavelength range into which it emits light. A signal may be isolated from a given type fluorophore by using a filter that only passes the wavelength range attributed to that fluorophore. To only collect light coming from fluorophore type A, an emission filter A may be placed in front of the camera. To see fluorophore B, an appropriate filter B is used. This is useful to quantify fluorophores A and B in isolation. The fluorescence distribution on the sensor of the camera 150 is an array of bright spots as shown by FIG. 1B, with each spot corresponding to an image of a microlens 121. The brightness of each microlens 121 imaged in this way is proportional to the fluorescence excited from the sample 130 at the focal spot of each microlens 121. The set of camera sensor pixels corresponding to the image of each microlens can therefore be thought of as playing the same role as the point detector of a conventional scanning confocal microscope.

The camera 150 may be configured to acquire a video at 200 frames per second (FPS) with the camera gain set to its minimal value. Other frame acquisition rates are also possible, provided that in combination with the stage travel velocity, they lead to the desired spatial sampling frequency. For example, frame rates below 50 FPS may not be desirable as they may not provide significant performance gain over regular microscope systems. The upper limit depends on the sample and on the quality of the piezo stage. For example, frame rates of 600 FPS and higher are possible but become increasingly difficult to collect enough signal above 200 FPS.

The sample 130 is raster scanned under the focal spot array as the movie is recorded. The sample 130 may sit on a piezo stage 140, for example, a closed loop piezoelectric stage such as a Newport NPXY200SG, which may be driven by a sawtooth wave to yield a speed of 100 µm/s along the x-direction, resulting in a sampling density of 0.5 µm per camera frame. A slow linear ramp of 0.37 µm/s may be applied along the y-direction. The image of the portion of the sample 130 gathered by each microlens 121, referred to herein as a sub-FOV, is assembled by summing pixel values of the microlens image in the raw video and reorganizing them appropriately into a two dimensional image. This image may have dimensions of, for example, 135 µm×118 µm and a pixel size of 0.5 µm. Other image dimensions are also possible. The image size may be tied to the microlens configuration. There is preferably at least 10 µm of overlap between the images from neighboring microlenses 121 to facilitate image stitching. An exemplary microlens arrangement includes a 125 µm pitch hexagonal grid. Therefore the x-direction is scanned over 135 µm (125 µm+10 µm). The distance between rows of a 125 µm pitch hexagonal grid is approximately 108 µm, so in the y-direction is preferably scanned over 118 µm. The dimensions will vary accordingly for larger or smaller microlenses 121.

The pixel size depends on the resolution of the microlens array 120. Under the first embodiment, the resolution of the microlens array is on the order of 1.2 µm and the pixel size needs to be smaller than half of that in order to take advantage of all of this resolution, as per the Nyquist criterion. Smaller pixel sizes may be used at the expense of image acquisition time, and larger pixels can be used at the cost of losing resolution. Note that this does not refer to the final image size, just the size of each image element, of which there may be 90,000 or more in the entire stitched image.

Fluctuations in laser intensity may mitigated by dividing by the normalized average of all microlens intensities from each camera frame. A large FOV image is created by stitching together all of the sub-FOVs on a hexagonal lattice using nonlinear blending to minimize seams, for example, by software executed in a computer, as described further below.

For example, standard optical lithography may be followed by reflow to fabricate hexagonally packed MLA masters that are subsequently replicated into an optical adhesive (NOA 61) on a glass slide. This replicated MLA 120 may be used for imaging experiments. The microlenses 121 in this example have diameters of 122 µm and sags of 11.7 µm. The entire array measures 4.5 cm×4.5 cm and contains more than 140,000 microlenses. Such an MLA 120 produced no observed measurable axial chromatic aberration: the MLA had a focal length of 248 µm±2 µm (NA=0.24) for all three laser wavelengths.

Exemplary MLA 120 dimensions may be 0.5-6 cm, with microlens elements 121 anywhere from 40-250 um in diameter. Square grids or hexagonal grids are preferred, but other configurations are possible. Square grids are easier for image processing, but hexagonal grids have a higher packing density which means faster imaging. Typical microlens sag (height) range from ⅕ to 1/20 of the diameter of the lens.

The resolution of the system 100 of the first embodiment may be determined by the focal spot size. The focal spots created by the MLA 120 do not reach the diffraction limit owing to spherical aberration inherent in the reflow molding fabrication technique. The full width at half maximum (FWHM) values of the microlens focal spots may be measured by imaging the focal plane with a microscope objective with a numerical aperture (NA) of 0.80 and a magnification of 100 times. Gaussian fits are applied to the images of the focal spots (FIG. 1C), for field angles ranging between 0° and 2.5°. Larger ranges of field angles are also possible. A focal stack is acquired by moving the microlens array 120 slowly through the focus of the microscope objective 110. The frame is extracted with the highest peak pixel value and this image is used for focal spot characterization. The focal length may be determined experimentally by recording the distance between this focal spot plane and the base of the microlens 121. Thus, the working distance $W_d$ of the microlens array is equal to the focal length minus the sag may be:

$$W_d = 248 \text{ µm} - 11.7 \text{ µm} = 236.3 \text{ µm}. \quad (Eq. 1)$$

The small field angle has almost no discernable effect on the focal spot size and shape. For example, the focal spot FWHMs at 0° field angle were found to be 1.44 µm±0.03 µm, 1.30 µm±0.03 µm, and 1.20 µm±0.03 µm for red, green and blue excitation lasers, respectively. At a field angle of 2.5°, the FWHMs were found to be 1.47 µm±0.03 µm (red), 1.30 µm±0.03 µm (green), and 1.22 µm±0.03 µm (blue). The uncertainty was a 95% confidence bound for the Gaussian FWHM parameter when fit to an experimentally measured focal spot. The FWHM values were slightly larger than the FWHMs for a diffraction-limited 0.24 NA lens approximated by a Gaussian focal spot: 1.37 µm, 1.10 µm, and 0.98 µm, respectively.

Figure 2A:
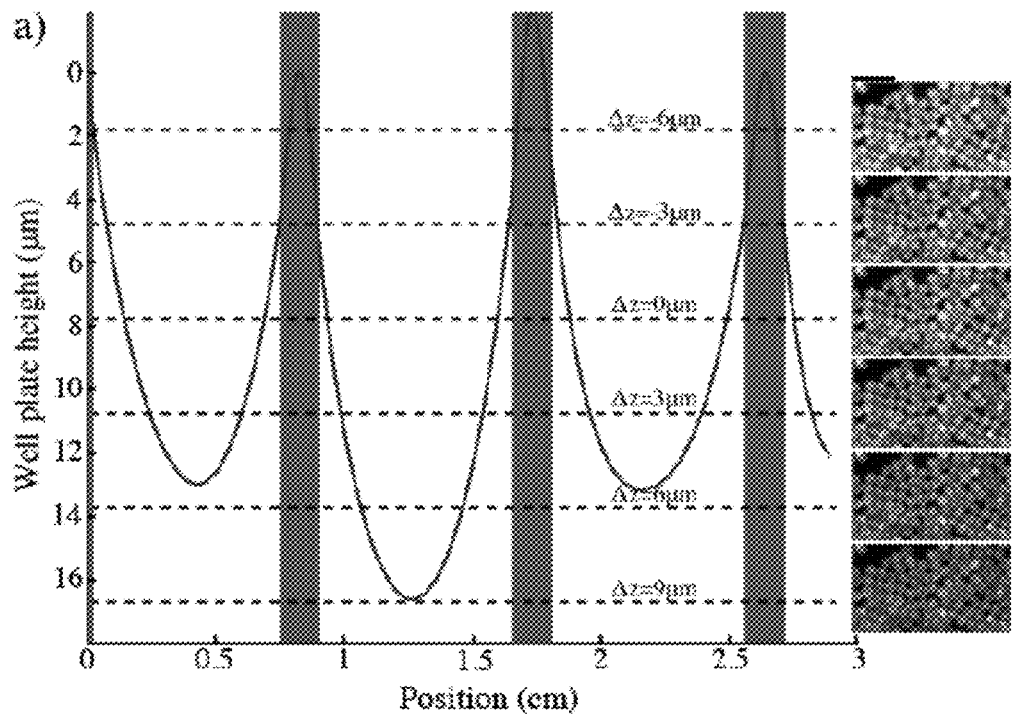
FIG. 2A is a graph of a contact profilometry trace of the bottom of an Ibidi 96-well plate.

Fluorescent samples are not completely flat over large areas. In HCS applications, fluorescent samples typically reside in microwell plates. For our system to have applicability in drug discovery labs that employ HCS, it is necessary that the microwell plate flatness be sufficient to ensure that the height variation within the FOV is less than the depth of field of the system. FIG. 2A shows a contact profilometry trace of the bottom of an Ibidi 96-well plate. A contact profilometry height trace along a 3 cm line on a 96-well plate is shown. The greyed out vertical bars are sections of plastic support on the well plate where there is no fluorescent sample. The insets on the right hand side of FIG. 2A show FOV of 5 µm diameter fluorescent microspheres (Nile Red, green channel) at the focal distances indicated by the dotted horizontal lines. Positions are relative to the best focus plane. Negative distances are closer to the MLA and positive distances are farther away from the MLA. The scale bar is 20.5 µm.

Over a 3 cm line trace, the variation in well height is approximately 15 µm. The FIG. 2A insets show a focus stack of a FOV containing wrinkled 5.3 µm diameter Nile Red beads (535/575 nm excitation/emission peaks), imaged with the green excitation channel (532 nm) of the microlens microscope. Subjectively, the image quality variation over the 15 µm range is nearly imperceptible. We quantify the imaging quality by imaging isolated sub-resolution 500 nm Nile Red fluorescent beads (Invitrogen), yielding the point spread function (PSF) of the green channel of the system. The modulation transfer function (MTF) for each imaging depth is calculated by taking the magnitude of the Fourier transform of the measured PSF.

Figure 2B:
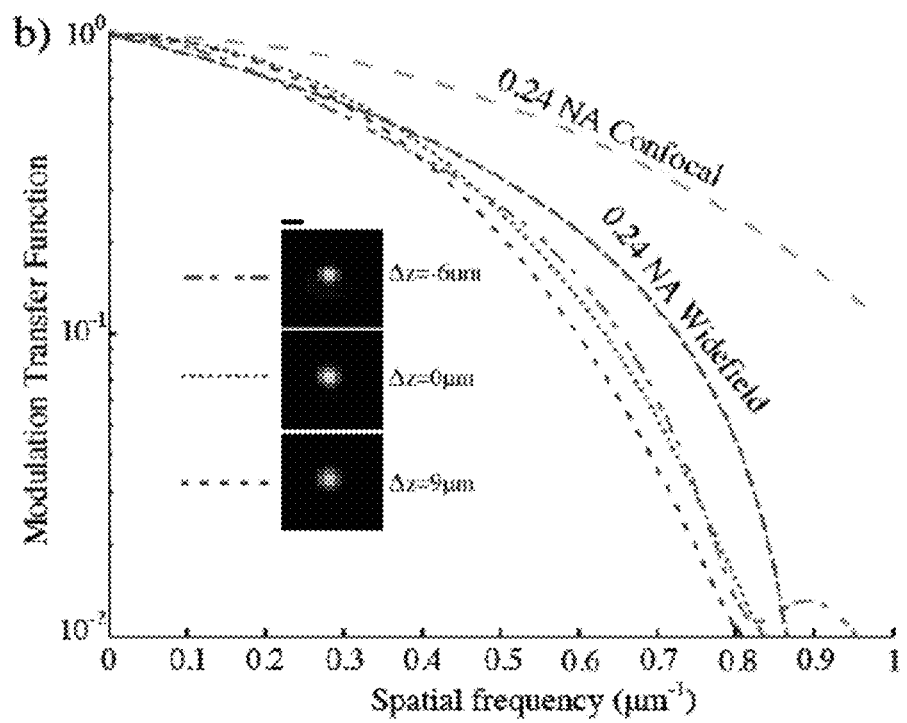
FIG. 2B is a graph plotting the MTF and PSF for imaging depths 6 µm above, 9 µm below and at the plane of best focus of the MLA of FIG. 1A.

FIG. 2B plots the MTF and PSF for imaging depths 6 µm above, 9 µm below and at the plane of best focus. FIG. 2B shows modulation transfer functions (MTFs) for the green laser channel at z=−6, 0, and 9 FIG. 2A shows from the best focus plane. Diffraction limited MTFs for 0.24 NA wide field and confocal microscopes with circular apertures are shown. All MTFs are normalized to a maximum value of 1. Insets in FIG. 2B show images of a 500 nm bead (the PSF) placed at z=−6, 0, and 9 from the best focus plane. The scale bar is 2 µm.

As per convention, the MTFs are normalized to unity. Corroborating the observation that that imaging quality varies minimally over a 15 µm depth of focus, the MTF has almost no change over this range. Interestingly, at low spatial frequencies, the MTF of our system lies above that of a diffraction-limited 0.24 NA circular aperture wide field system. This is likely due to apodization of the microlens apertures by the steep angle of the lens at the periphery. The result is increasing reflection losses towards the edge of the microlenses 121 (FIG. 1A). This effect manifests itself as low-pass filtering. Note that this does not mean that microlenses of the first embodiment are more efficient at imaging low spatial frequencies than a diffraction limited system. Because the MTF plot is normalized, the correct interpretation is that the low spatial frequency signal is boosted relative to the high spatial frequency signal when compared to the diffraction-limited case.

The following experimental data was produced by the first embodiment. Sixteen (4×4) wells of a 96-well plate (Ibidi) were filled with a mixture of Dragon Green (Bangs Labs), Nile Red (Invitrogen) and Flash Red (Bangs Labs) fluorescent beads. The Dragon Green and Flash Red beads were nominally 7.3 µm in diameter with excitation/emission peaks at 480/520 nm, and 660/690 nm, respectively. The Nile Red beads had excitation/emission peaks at 535/575 nm, are nominally 5.3 µm in diameter and were aged so that their surface was wrinkled, yielding high spatial frequency features. Three separate images of the 4×4 well area were acquired with laser wavelengths of 473 nm (blue), 532 nm (green) and 658 nm (red). The camera exposure time was 3.5 ms/frame and the approximate optical power in each focal spot was 0.13 µW, $3.1 \times 10^{-2}$ µW and $3.7 \times 10^{-2}$ µW for blue, green and red lasers, respectively. For 473 nm excitation, a 10 nm FWHM bandpass fluorescence emission filter centered at 500 nm was used. Long pass filters with cut on wavelengths at 575 nm and 664 nm were used for excitation wavelengths of 532 nm and 658 nm, respectively. These excitation wavelength and emission filter combinations separated the beads into their constituent populations without the need for spectral unmixing.

Figure 3:
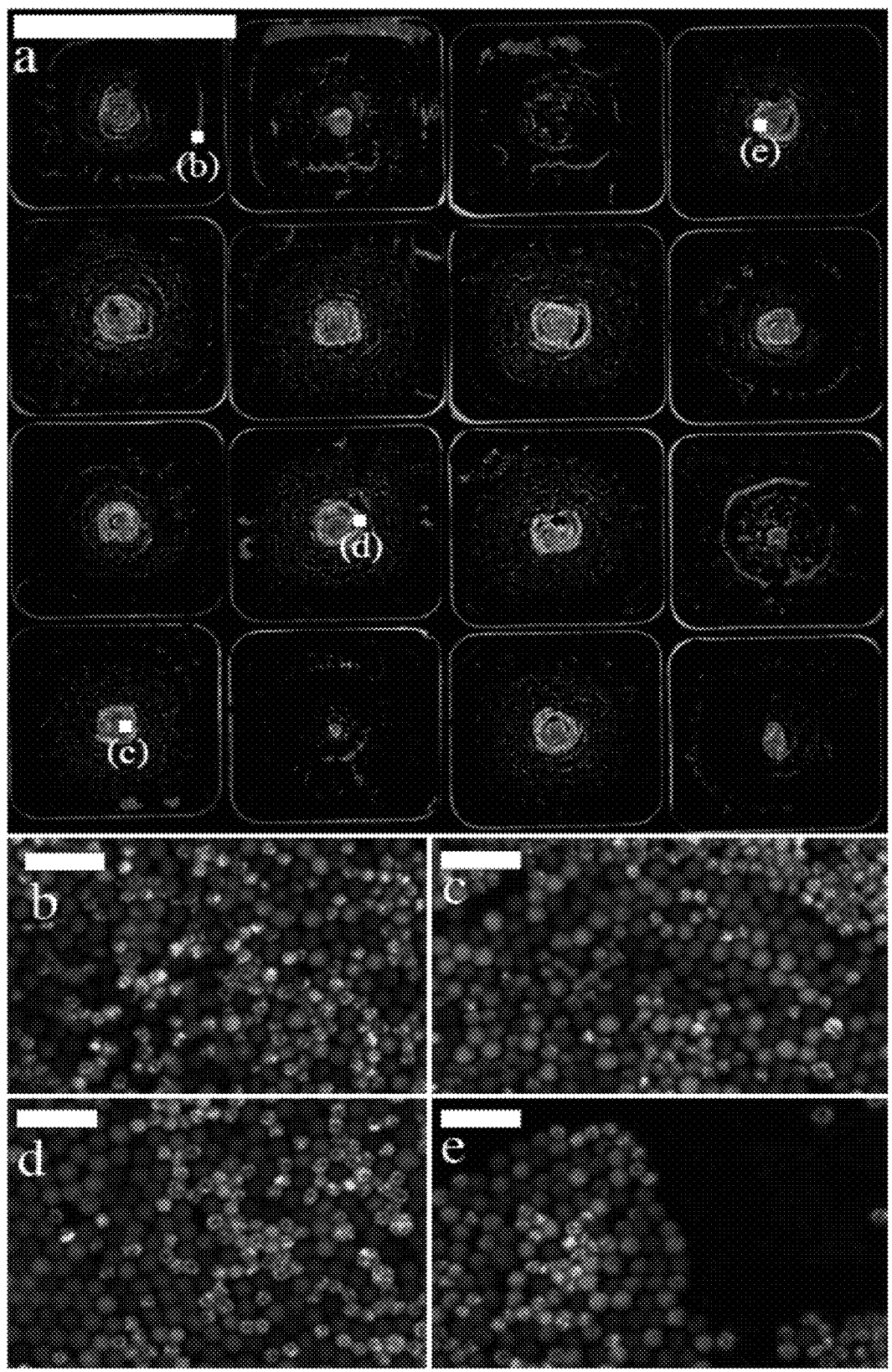
FIG. 3 is a collection of photographs showing images of 16 wells imaged by the MLA of FIG. 1A, along with magnified regions of four wells.

FIG. 3, panel (a) shows three channel image 16 well section of a 96-well plate, filled with fluorescent microspheres. Red, green and blue fluorescent microspheres are excited with red, green and blue laser lines, respectively. Red and blue microspheres have a nominal diameter of 7.3 µm. Green microspheres have high spatial frequency features due to wrinkling and have a nominal diameter of 5 µm. White boxes denote locations of panels (b)-(e). The scale bar is 8 mm. FIG. 3 panels (b) to (e) show zoom-in of regions indicated in panel (a). The scale bars are 25 µm.

FIG. 3 panel (a) shows an image of all 16 wells imaged, along with magnified regions of four wells (panels (b)-(e)). Color channels were aligned by finding the position of their cross-correlation minimum and correcting for this offset. Wrinkling of the green-colored beads was evident, while the blue- and red-colored beads had smooth surfaces. All areas of the 4×4 well region were in focus owing to the large depth of field of the microlenses, which accommodates both intra- and interwell height variations. The 4×4 well region had an area of 12.25 $cm^2$, corresponding to 90,550 microlenses. At a frame rate of 200 fps this represents a total pixel throughput of 18.1 Mpx/s. A portion of this data corresponded to the plastic support regions between wells (FIG. 2A), which contained no fluorescent sample. Also, a small amount of overlap (10 µm) between neighboring sub-FOVs was necessary for the stitching process. After accounting for these two factors, the final dataset for each color consisted of 16 images each 16000×16000 pixels in size. The acquisition time was 320 s, corresponding to a pixel throughput of 12.8 Mpx/s.

Figure 4:
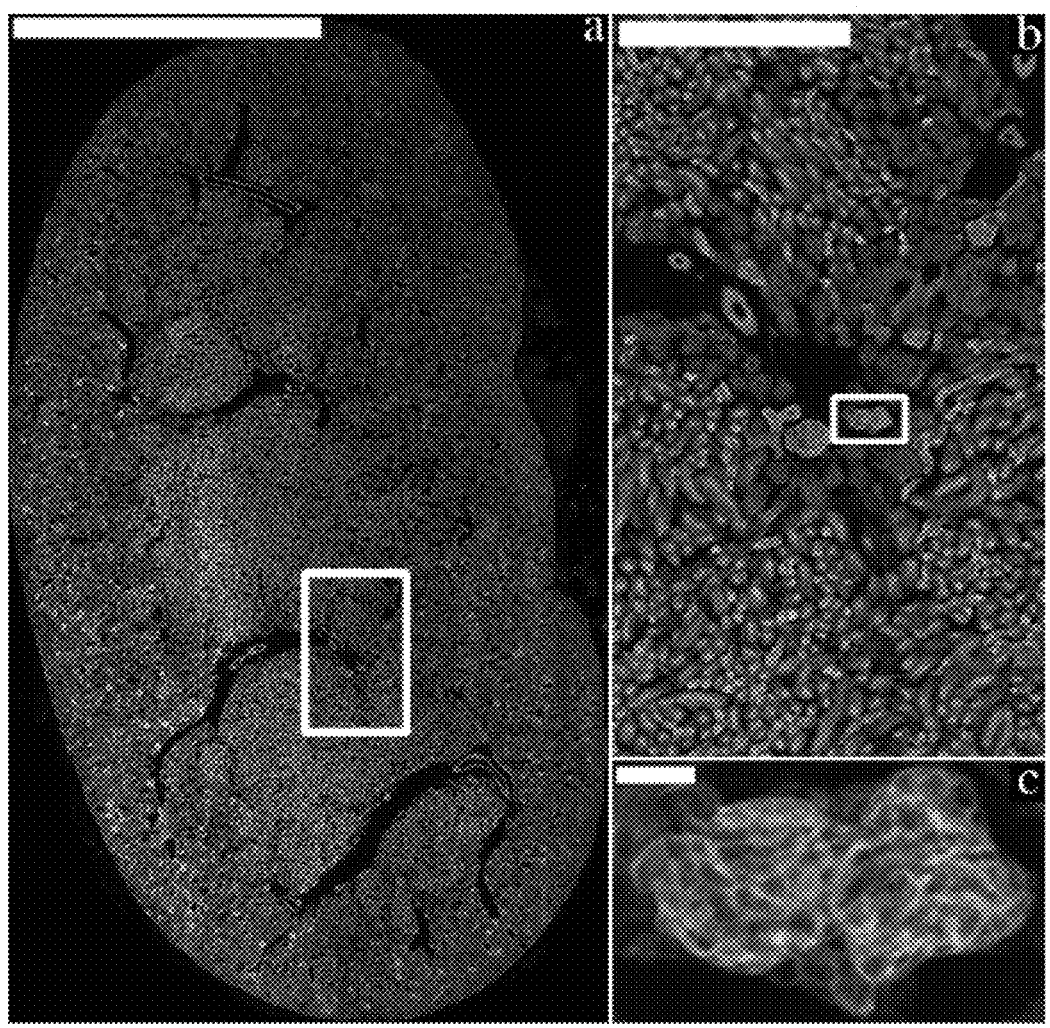
FIG. 4 is a collection of photographs showing an example of the tissue imaging capability of the MLA of FIG. 1A, showing a 16 µm thick slice of mouse kidney.

FIG. 4 is an example of the tissue imaging capability of the first embodiment. Panel (a) shows a full field view of a dual channel image of a mouse kidney slice. The scale bar is 3 mm. Panel (b) shows a zoomed-in view of boxed region in (a). The scale bar is 500 µm. Panel (c) shows a further magnified view of the boxed region in panel (b). The scale bar is 10 µm.

Panel (a) shows a 16 µm thick slice of mouse kidney (Life Technologies FluoCells Prepared Slide #3), sealed between a microscope slide and a #1.5 coverslip. The tissue section was stained with Alexa Fluor 488 and Alexa Fluor 568 Phalloidin, while the fluorescent stain 4',6-diamidino-2-phenylindole (DAPI) was also present but not imaged. Laser excitation wavelengths of 473 nm (focal spot power≈0.20 µW) and 532 nm (focal spot power≈0.55 µW) were used to excite the Alexa Fluor 488 and 568 fluorophores, respectively, whose emission was filtered with long pass filters with cut-on wavelengths of 500 nm and 575 nm. The camera integration time was set to 4.9 ms/frame. As some of the tissue features stained with different fluorophores tended to be co-localized, the channels were aligned by finding their cross correlation maximum and correcting for that shift. The resulting aligned image is shown in FIG. 4, panel (a), with the Alexa Fluor 488 (568) channel boxed. The sample had an extent of ~0.5×1 cm. At a moderate zoom level, the brush border and glomeruli could be identified (FIG. 4 panel (b)). At full image size (FIG. 4 panel (c)), fine features such as filamentous actin and microtubules were visible. FIG. 4 (Media 1) shows the sample at various magnifications, zooming in from the full field view in FIG. 4(a), and finishing with an image of the region in FIG. 4(c).

As discussed above, the first embodiment 100 records the fluorescence collected by each microlens 121 by integrating the pixels associated with its image on the camera sensor. This extends the dynamic range of the imaging system to exceed that of each pixel of the camera. Recall from FIG. 1B that each microlens 121 aperture is imaged to an n×n pixel region on the camera sensor. Therefore, even though the camera records an 8-bit video, the conglomeration of the $N=n^2$ pixels assigned to each microlens can take on values from 0 to 255×N. This combination of N pixels is referred to as a "superpixel." The extent of each microlens (122 µm), the extent of the camera sensor pixels (5.5 µm) and the approximately seven times demagnification provided by the SLR lens result in the superpixel including N=9 pixels.

A point spread function (PSF) created by the SLR lens 160 on the camera sensor 150 is comparable in size to the image of a microlens 121, leading to an image of a microlens 121 that resembles a Gaussian spot. As a result, the center of the image of a microlens 121 saturates its camera pixel before a pixel on the periphery of the microlens image saturates. This restricts off center microlens pixels to smaller dynamic ranges than the center. Thus, unsaturated superpixel values may be restricted to values smaller than 255× 9=2295.

To quantify the dynamic range of the first embodiment system, a movie of microlenses relaying fluorescence was recorded in the following configuration. The piezo stage was not scanned and the SLR lens aperture was set to f/8. The microlens focal spots were brought into focus so that they excited fluorescence at the sample. 300 frames were recorded at 200 fps. Laser fluctuations were mitigated by dividing each frame by the average intensity of all microlenses in the frame and then multiplying by the highest average microlens intensity of all of the frames. The signal-to-noise ratio (SNR) of a superpixel i was calculated by dividing the mean superpixel value $\mu_i$ by its standard deviation $\sigma_i$. The SNR curve for a N=1 superpixel was calculated using only the central pixel in each superpixel. For the N=9 case all 9 pixels that make up the image of each microlens were summed and then the SNR was calculated using this summed value. In order to avoid pixel value saturation, superpixels for which any pixel reached a value of 255 during the movie were excluded.

Figure 5:
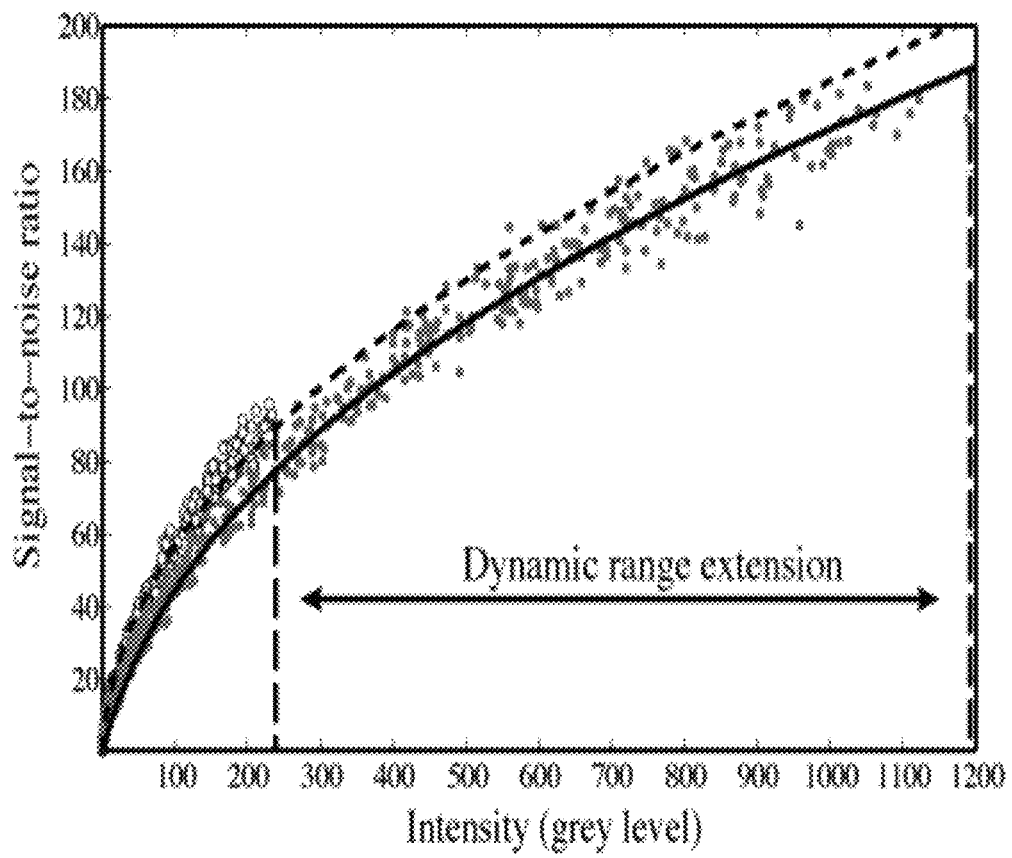
FIG. 5 is a graph plotting the signal-to-noise ratio (SNR) curves of the microlens imaging system of FIG. 1A.

FIG. 5 shows a comparison between the SNR curves for superpixels of size N=1 and N=9 pixels. The N=9 curve shows lower SNR than the N=1 curve due to increased read noise arising from the use of 9 pixels. This property is captured by a model that accounts for shot noise $\sqrt{\alpha l}$ camera pixel read noise $n_r$: SNR=$\alpha l/\sqrt{\alpha l+n_r^2}$, where l is the signal intensity in grey level units (e.g. 0 to 255 for N=1). This model was fitted to the data in FIG. 4, resulting in best fit parameters of $(\alpha,n_r)=[(34.21, 13.64); (31.00, 41.97)]$ for N=1 and N=9 superpixels, respectively. For the N=9 fit only data points were used where every pixel in the superpixel had a grey level above 0. Pixels within a superpixel that contained no signal do not contribute to the overall noise because the read noise is below one grey level. As expected, the read noise for an N=9 superpixel was 3.1-fold (approximately $\sqrt{9}$) higher than for the N=1 case, because noise sources within a superpixel add in quadrature.

At the top end of the dynamic range, the SNR is dictated by shot noise. Because an N=9 configuration can collect more photons before saturation, the maximum SNR is increased. An 87% larger SNR was measured for N=9 (SNR=174) than for N=1 (SNR=93) at the top of the dynamic range.

FIG. 5 shows signal-to-noise ratio (SNR) curves of a microlens imaging system. White and grey circles are SNR curves for superpixel sizes of N=1 and N=9 pixels, respectively. The dashed (solid) curve is a fit to the N=1 (N=9) data of the form SNR=$\alpha l/\sqrt{\alpha l+n_r^2}$, where $\alpha$ and $n_r$ are fitting parameters and l is the pixel intensity (grey level). Dynamic range extension occurs for intensities (grey levels) lying between the vertical dashed lines.

The dynamic range is also improved with the N=9 superpixel configuration. The largest unsaturated signal for N=9 takes a grey value of 1190 while the fitting results in FIG. 5 suggest that the noise floor (SNR=1) is at a grey level of 1.37. The dynamic range of an N=9 superpixel is therefore 1190/1.37=868 (58.77 dB). For an N=1 superpixel, the dynamic range is limited to 255 (48.13 dB) by 8-bit digitization. The dynamic range for an N=9 superpixel is increased 3.4-fold (868/255) over the intrinsic dynamic range of the camera, from 8 bits to 9.76 bits. The increase in dynamic range comes with the caveat that it inherently occurs at higher signal levels: the extra bits come at the top end of dynamic range, as indicated by the dynamic range extension region in FIG. 5.

For weakly fluorescent samples, imaging can become read noise dominated. A superpixel of size N contributes $\sqrt{N}$ times more read noise than a single pixel, modifying the SNR by a factor of $1/\sqrt{N}$. Therefore, when sensitivity is paramount, it is optimal to reduce the magnification in order to direct all the photons from a single microlens to as few pixels as possible (small N). However, the magnification should be kept large enough to ensure that the images of the microlenses are still resolvable on the camera. The magnification can thus be tailored according to the nature of the sample in order to maximize either sensitivity or dynamic range.

Figure 6:
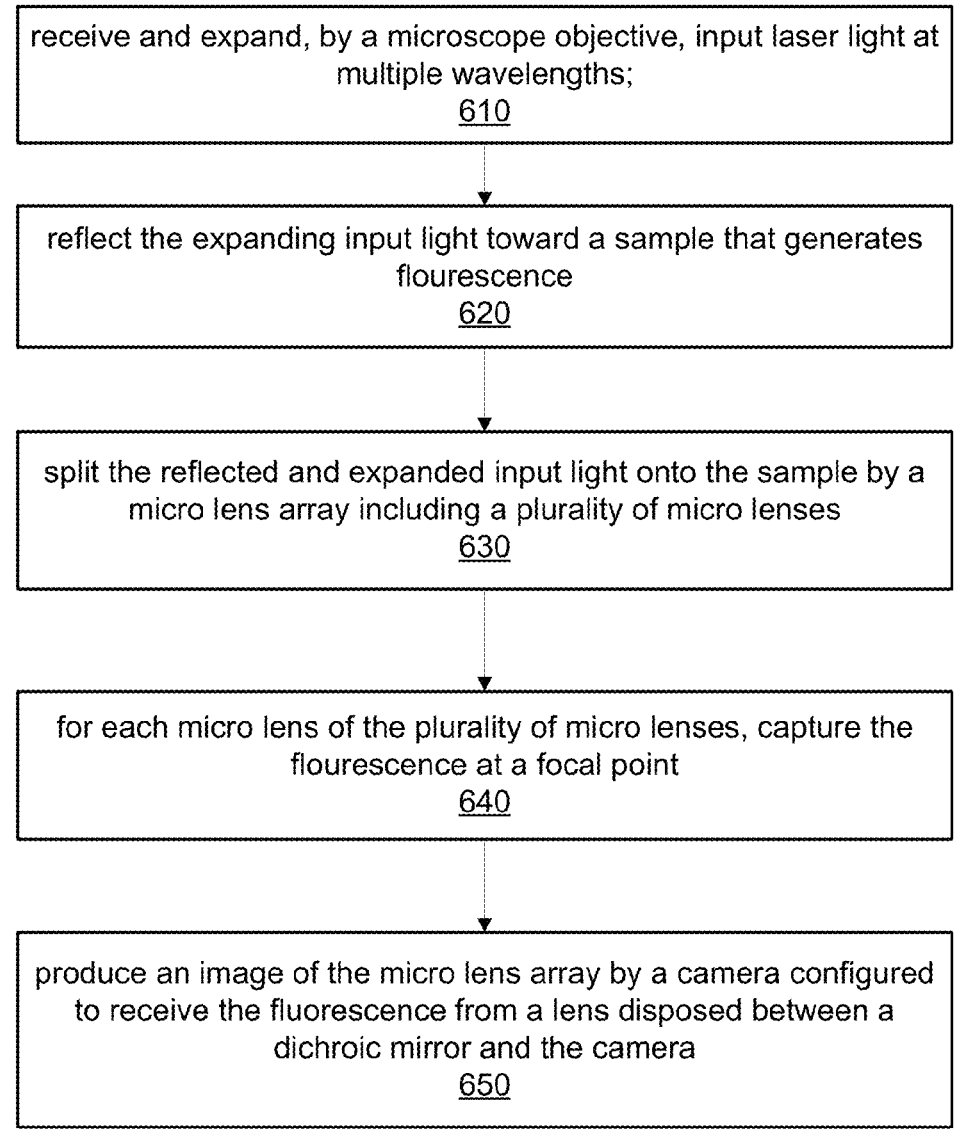
FIG. 6 is a flowchart of an exemplary method for collecting a fluorescence microscopy image.

FIG. 6 is a flowchart of an exemplary method for collecting a fluorescence microscopy image. The method is described with reference to the system 100 of FIG. 1A. Portions of the method may be executed, for example, by a computer. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Figure 7:
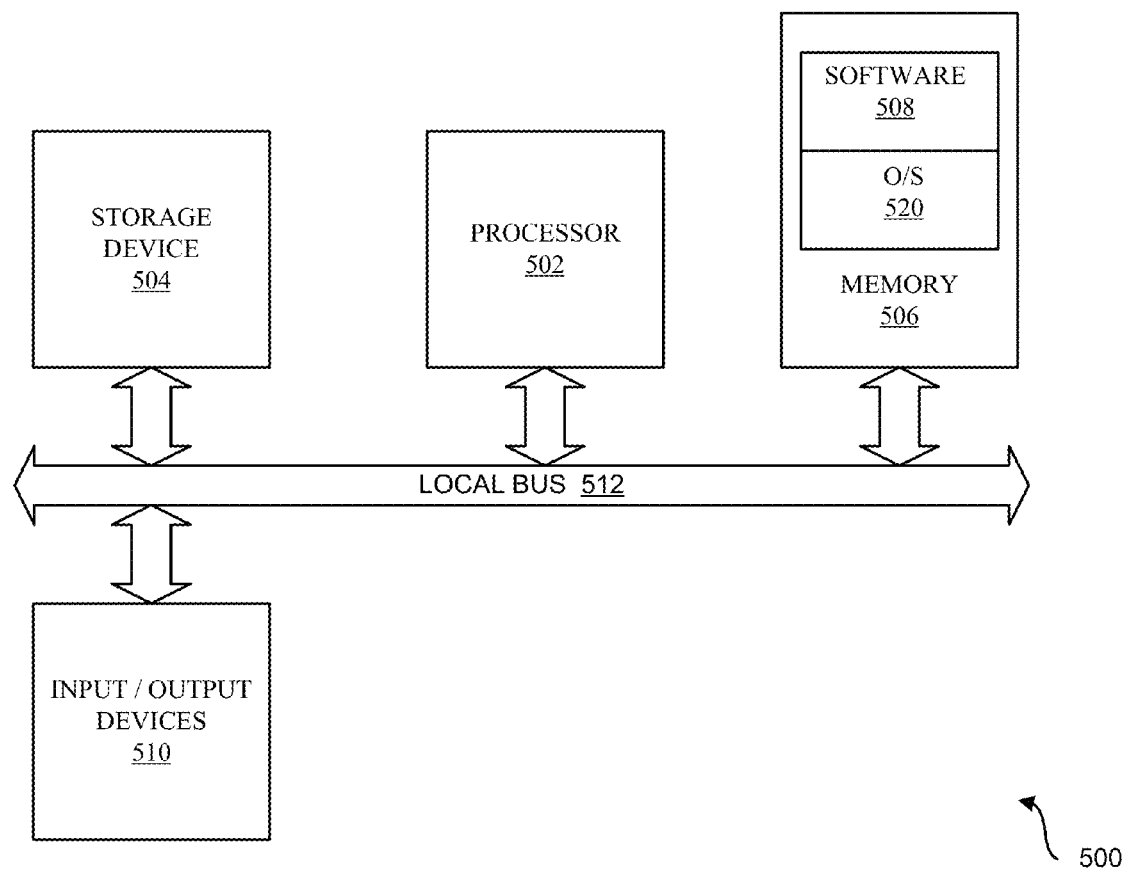
FIG. 7 is a schematic diagram illustrating an example of a system for executing functionality of the present invention.

A microscope objective 110 receives and expands input laser light 115 at multiple wavelengths, as shown by block 610. The expanding input light 112,172 is reflected toward a sample 130 that generates flourescence, as shown by block 620. The expanding input light 112 may be reflected, for example, by a dichroic mirror 170. The reflected and expanded input light 172 is split onto the sample 130 by a micro lens array 120 including a plurality of micro lenses 121 as shown by block 630. For each micro lens of the plurality of micro lenses 121, the flourescence is captured at a focal point of the micro lens 121 as shown by block 640. An image of the micro lens array 120 is produced by a camera 150 configured to receive the fluorescence from a lens 160 disposed between a dichroic mirror 170 and the camera 150, as shown by block 650. The (SLR) lens 160 creates an image of the microlens array 120 on a sensor of the camera 150. An image of the sample 130 is constructed digitally after image processing (after acquisition). As previously mentioned, the present system for executing the functionality described in detail above may be a computer, an example of which is shown in the schematic diagram of FIG. 7. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Additional embodiments may relate to color channel alignment techniques. Cellular structures labelled with different fluorophores may be co-located or at least located in the vicinity of one another. As a result, in order to align the different color channels, the following color channel alignment procedure may be performed at least in part to correct the spatial offset between color channels.

Initially the cross correlation between two large, fully stitched, single-channel images may be calculated up to a maximum spatial offset of pixels, for example, 1000×1000 pixels. This amounts to a sum of the element-wise multiplication between the two images for all offsets ranging from 0 to 1000 pixels in the x- and y-directions. Where there is empty space in one of the images (e.g., areas with no cells) this multiplication leads to a small number. However, when structures from both images overlap because of the offset that has been applied, this multiplication and subsequent summation leads to large numbers. If the offset is properly corrected this procedure results in a peak value for the cross correlation. Thus, the correct offset value may be found by identifying the offset that results in a large (e.g., largest) cross correlation value. Once this information is in hand, the two color channels can be registered by shifting by the offset that was found via cross correlation. To register a third (or any other subsequent channels) the same procedure is applied, using the third channel and either of the previous two channels to perform the cross correlation.

Some embodiments may relate to high dynamic range imaging. Each image captured by a micro lens may be generated by plotting the intensity in the microlens image as a function of time. The intensity of the microlens image in each frame is assigned to the appropriate pixel in a 2D image. For instance, if the image recorded by the microlens is 250×300 pixels, then the first row of the image will consist of the intensities of the microlens image from frames 1 to 250. The second row is frames 251 to 500 and so on.

To calculate the intensity of the microlens image, the pixel values within the microlens image are summed. The number of pixels involved varies with the magnification used in the system but is typically about 9 pixels. However, the light is not uniformly distributed within the image of the microlens. The image of the microlens may not be a sharp disk, but may resemble more a 2D Gaussian function. This means that the center of the image of the microlens is brighter than its periphery.

Accordingly, the intensity of the microlens image may be calculated in a different way in order to extend the dynamic range. Instead of summing the pixel values of all 9 pixels within a microlens, an image may be constructed by using only 1 of the pixels within the image of the microlens. This may be repeated for all pixels in the microlens resulting in 9 images of the same sample. The image constructed by using the central microlens pixel may be the brightest and images from the peripheral microlens pixels may be the dimmest. If there are very bright regions in the image, the central microlens pixel may saturate, attaining a maximal value, for example 255 for an 8 bit camera. This results in a loss of information because it is unknown how bright that pixel should be, but known the brightness is above the maximum value. However, the peripheral microlens pixel may not be saturated because it is producing a dimmer image. If the relative exposure between the two pixels is known, the value of the central pixel may be calculated. For example, if the central pixel is always twice as bright a peripheral pixel, then if the peripheral pixel has a value of 200, then the central pixel should have had a value of 400 even though it saturated at 255. Thus the dynamic range of the image may be extended beyond the 8 bits recorded by the camera. The implementation of High Dynamic Range (HDR) imaging in the context of the above microscope embodiment may follow the above-described procedure, applied to the images produced by all of the microlenses.

In summary the above described embodiments have demonstrated an extended dynamic range MLA-based high throughput multichannel fluorescence imaging system. For photon limited imaging, the embodiments acquire images with a dynamic range beyond that of the pixels of the image sensor. The microscope uses a MLA to image over a large FOV, thereby reducing mechanical dead time inherent in commercial high throughput imagers. Fluorescent beads were imaged in a microwell plate at a rate of 3 wells per minute per channel at resolutions up to 1.20 µm. The total pixel throughput of the system was 18.1 Mpx/s. Considering much of microwell plate consisted of plastic support regions (that do not contain beads) and the stitching overhead, the pixel throughput was found to be 12.8 Mpx/s. This is roughly three times faster than commercial microscopes. Even higher speeds may be possible with continuous samples with no dead space. Multichannel tissue imaging examples indicate the applicability of the present invention to arrayed tissue imaging. The system is further adaptable to a variety of applications in biological research requiring high throughput imaging, for example for labeled brain tissue sections in neuroscience, among others.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A microscope, comprising:
   a multi-wavelength emitting laser light source;
   a microscope objective configured to receive and expand input light emitted from the light source;
   a dichroic mirror configured to reflect the expanded input light;
   a micro lens array comprising a plurality of micro lenses, configured to split the reflected and expanded input light onto a fluorescence producing sample;
   a lens configured to collectively capture the fluorescence for each micro lens in the plurality of micro lenses; and
   a camera configured to receive the fluorescence from the lens and produce an image of the sample based, at least in part, on the received fluorescence,
   wherein the microscope objective and the lens are located at approximately a same distance from the dichroic mirror such that the fluorescence for each micro lens is captured substantially at its focal point.

2. The microscope of claim 1, wherein the multi-wavelength emitting laser light source comprises at least two channels such that the image is produced with at least two colors.

3. The microscope of claim 1, wherein the multi-wavelength emitting laser light source comprises at least three channels such that the image is produced with at least three colors.

4. The microscope of claim 1, further comprising an emission filter disposed between the lens and the camera.

5. The microscope of claim 4, wherein the emission filter is configured to be tuned separately for one color at a time.

6. The microscope of claim 1, wherein the lens comprises a single reflex lens.

7. The microscope of claim 1, wherein the dichroic mirror is oriented such that the fluorescence for each micro lens is oriented at an angular range of −3° to +3° degrees.

8. A method for collecting a fluorescence microscopy image, comprising the steps of:
   receiving and expanding, by a microscope objective, input laser light at multiple wavelengths;
   reflecting by a dichroic mirror the expanding input light toward a sample that generates fluorescence;
   splitting the reflected and expanded input light onto the sample by a micro lens array comprising a plurality of micro lenses;
   for each micro lens of the plurality of micro lenses, capturing the fluorescence at a focal point located at a second distance from the dichroic mirror approximately equal to a first distance from the dichroic mirror and the microscope objective; and producing an image of the sample by a camera configured to receive the fluorescence from a lens disposed between the dichroic mirror and the camera.

9. The method of claim 8, further comprising the step of filtering fluorescence captured by the lens with an emission filter.

10. The method of claim 8, further comprising the step of tuning the emission filter separately to each color of a plurality of colors with which the image is produced.

11. The method of claim 8, wherein the lens comprises a single reflex lens.

12. The method of claim 8, further comprising the step of determining an intensity of an image produced by a micro lens of the plurality of micro lenses.

13. The method of claim 12, wherein the step of determining an intensity of an image produced by a micro lens of the plurality of micro lenses further comprises determining the intensity of a saturated pixel of the micro lens.

14. The method of claim 13, wherein the step of determining an intensity of the saturated pixel of the micro lens further comprises the steps of:
   determining the intensity of an unsaturated pixel of the micro lens;
   determining a relative intensity ratio between the saturated pixel and the unsaturated pixel; and
   applying the ratio of the unsaturated pixel to the intensity level of the unsaturated pixel to determine the intensity level of the saturated pixel.

15. The method of claim 12, further comprising the step of plotting the determined intensity in the microlens image as a function of time.

16. The method of claim 12, further comprising the step of assigning an intensity of the microlens image in a frame to a pixel in a 2D image.

17. The method of claim 12, wherein the step of determining an intensity of an image produced by a micro lens of the plurality of micro lenses further comprises summing values of all pixels within the microlens.

18. The method of claim 8, further comprising the step of aligning color channels to correct the spatial offset between color channels.

19. The method of claim 18, further comprising the step of cross correlating a first single channel image of a first color channel with a second single-channel image of a second color channel.

20. The method of claim 19, further comprising the step of identifying an offset that results in a large cross correlation value.

21. The method of claim 20, further comprising the step of registering the first color channel with the second color channel by shifting by the offset that was found via cross correlation.

22. The method of claim 21, further comprising the step of registering a third channel with either of the first color channel or the second color channel.

* * * * *